(12) United States Patent
Raisch et al.

(10) Patent No.: US 12,072,007 B2
(45) Date of Patent: Aug. 27, 2024

(54) POWERSHIFT TRANSMISSION AND VEHICLE

(71) Applicant: DEERE & COMPANY, Moline, IL (US)

(72) Inventors: Stefan Raisch, Vaihingen/Enz (DE); Thomas G. Ore, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 64 days.

(21) Appl. No.: 18/041,264

(22) PCT Filed: Jul. 27, 2021

(86) PCT No.: PCT/EP2021/070926
§ 371 (c)(1),
(2) Date: Feb. 10, 2023

(87) PCT Pub. No.: WO2022/033860
PCT Pub. Date: Feb. 17, 2022

(65) Prior Publication Data
US 2023/0323934 A1    Oct. 12, 2023

(30) Foreign Application Priority Data

Aug. 12, 2020 (DE) ..................... 10 2020 121 209.7

(51) Int. Cl.
*F16H 3/093*   (2006.01)
*F16H 3/06*    (2006.01)
(Continued)

(52) U.S. Cl.
CPC ............ *F16H 37/046* (2013.01); *F16H 3/06* (2013.01); *F16H 3/093* (2013.01); *F16H 2003/0818* (2013.01); *F16H 2003/0822* (2013.01)

(58) Field of Classification Search
CPC .......... F16H 37/046; F16H 3/06; F16H 3/093; F16H 2003/0818; F16H 2003/0822
See application file for complete search history.

(56) References Cited

U.S. PATENT DOCUMENTS 4,345,490 A    8/1982   Madson
4,549,443 A   10/1985   White
(Continued)

FOREIGN PATENT DOCUMENTS

DE       10232835 B4 *  2/2010  ............. F16H 3/093
DE   102015220632 A1 *  5/2016  ............. F16H 3/093
(Continued)

OTHER PUBLICATIONS

WIPO International Search Report in application No. PCT/EP2021/070926, dated Oct. 28, 2021, 19 pages.

*Primary Examiner* — Justin Holmes

(57) ABSTRACT

A powershift transmission for a vehicle including an input shaft, a first intermediate shaft, a second intermediate shaft, and an output shaft. The input shaft includes a low driving gearwheel and a high driving gearwheel. The first intermediate shaft includes a low output gearwheel, a high output gearwheel, a first speed driving gearwheel, a second speed driving gearwheel, and a third speed driving gearwheel. The second intermediate shaft includes a first speed output gearwheel, a second speed output gearwheel, a third speed output gearwheel, a first-second group driving gearwheel, and a fourth speed output gearwheel. The output shaft includes a first-second group output gearwheel and a third group gearwheel.

12 Claims, 3 Drawing Sheets

(51) Int. Cl.
 *F16H 37/04* (2006.01)
 *F16H 3/08* (2006.01)

(56) References Cited

U.S. PATENT DOCUMENTS

| | | |
|---|---|---|
| 4,658,672 A | 4/1987 | Michael |
| 5,011,465 A | 4/1991 | Jeffries et al. |
| 5,063,793 A | 11/1991 | McAskill |
| 5,117,702 A | 6/1992 | Rodeghiero et al. |
| 5,178,039 A | 1/1993 | Shirley et al. |
| 5,249,475 A * | 10/1993 | McAskill .............. F16H 37/043 74/331 |
| 8,596,157 B2 | 12/2013 | Vu |
| 9,879,761 B2 | 1/2018 | Vu |
| 10,086,686 B2 | 10/2018 | Mueller et al. |
| 10,240,668 B2 | 3/2019 | Raisch |
| 2012/0048043 A1 | 3/2012 | Vu |
| 2019/0331201 A1 | 10/2019 | Laubmann et al. |
| 2020/0284322 A1 | 9/2020 | Müller et al. |
| 2020/0284323 A1 | 9/2020 | Müller et al. |
| 2020/0284324 A1 | 9/2020 | Gugel et al. |
| 2020/0284340 A1 | 9/2020 | Müller et al. |
| 2020/0362950 A1 | 11/2020 | Raisch |
| 2020/0400217 A1 | 12/2020 | Billich |
| 2021/0123511 A1 | 4/2021 | Eisenhardt et al. |
| 2021/0123513 A1 | 4/2021 | Raisch |

FOREIGN PATENT DOCUMENTS

| | | |
|---|---|---|
| DE | 102015225171 B4 | 7/2019 |
| EP | 0713033 A1 | 5/1996 |
| JP | S58163849 A | 9/1983 |
| JP | H11230278 A * | 8/1999 |
| KR | 100331639 B1 | 11/2002 |

* cited by examiner

POWERSHIFT TRANSMISSION AND VEHICLE

CROSS-REFERENCE TO RELATED APPLICATIONS

This application is a National Stage of PCT Application No. PCT/EP2021/070926, filed Jul. 27, 2021, which claims the benefit of and priority to German Patent Application No. 102020121209.7, filed Aug. 12, 2020, which are hereby incorporated by reference.

FIELD OF THE DISCLOSURE

The present disclosure relates to a powershift transmission for a vehicle, for example an agricultural or an industrial working vehicle, having at least two axially parallel transmission shafts which each bear gearwheels and shifting elements in order to implement transmission stages, the transmission stages comprising three groups and at least two gears, and to a vehicle, for example an agricultural or an industrial working vehicle, having a powershift transmission.

BACKGROUND

Powershift transmissions are known. They are used, for example, on vehicles, in particular on working vehicles, as used in agriculture, industry and in construction. Modern tractors or agricultural working vehicles, in particular high-powered ones, need to be efficient and have appropriate shifting convenience. Transmissions which are fully shiftable under load, powershift transmissions or PST for short, are therefore good alternatives to transmissions which are partially shiftable under load or continuously variable transmissions. Powershift transmissions of this type conventionally have a plurality of shifting regions.

SUMMARY

It is customary to provide such powershift transmissions with gearwheels, which are arranged on parallel axles, and multi-plate clutches, in order to be able to shift a certain number of transmission ratios without interrupting the power. A transmission of this type is used on large John Deere tractors as an e23 transmission and, along with the previously described construction, has a 2×4×3 combination of forward gears and reverse gears. US-A1-2012048043 discloses a transmission of this type. This construction provides a sufficiently large number of speeds both in the forward gear and in the reverse gear using as low a number as possible of piece numbers, costs, weight and mounting space. However, the "group" region of the transmission is relatively large and heavy. Both the A group and the C group require a very large dimensioning of their components because of the fairly large transmission ratio range which the group region has to provide. The groups have a spread of approximately 9, the A and the C group each have a transmission ratio of approximately 3, the A group stepped down and the C group stepped up. The middle or B group in turn has a transmission ratio of approximately 1. The output gearwheel of the A group and the input gearwheel of the C group are therefore approximately three times as large as the corresponding input and output gearwheels of the respective group. The minimally necessary size of the two small gearwheels is determined by the fact that they have to be accommodated on corresponding shafts. The resultantly necessary diameter of the small gearwheels in turn necessitates a very large outside diameter of the two large gearwheels, as a result of which the latter are relatively heavy and have a relatively large moment of inertia.

Furthermore, a powershift transmission under the name 16 PST is known from John Deere. U.S. Pat. No. 5,117,702 discloses a transmission of this type. The A group of said powershift transmission has a planetary transmission, wherein the sun gear of the planetary transmission is connected to an output gearwheel of the C group. The ring gear of the planetary transmission is connected to a multi-disk brake, that is to say to a multi-plate clutch which is connected to a transmission housing, and the planet gear carrier of the planetary transmission is connected directly to the output shaft. This transmission, despite its only 4 forward gears and 4 groups and its therefore relatively low number of only 16 transmission ratios for forward travel and 1×4 reverse gears, requires relatively large dimensioning and is not very compact.

The object on which the disclosure is based is therefore considered that of providing a powershift transmission and a vehicle, by means of which the aforementioned disadvantages are overcome.

The object is achieved according to the disclosure by the teaching of one or more of the following embodiments. Further advantageous embodiments and developments of the disclosure are disclosed herein.

In this regard, a powershift transmission for a vehicle, for example an agricultural or an industrial working vehicle, has at least two axially parallel transmission shafts which each bear gearwheels and shifting elements in order to implement transmission stages. The transmission stages comprise three groups and at least two gears. A first and a second group have an at least approximately identical transmission ratio in absolute terms, the first group being stepped up and the second group being stepped down. In some embodiments, the third group has a transmission ratio which significantly exceeds the transmission ratio of the first two groups and is realized in multiple stages. In some embodiments, the uniform distribution of the first and the second group results in a significantly advantageous, conventionally relatively small size of gearwheel for the second group. Furthermore, the similar transmission ratios of the first and the second group are advantageous since there can be better handling with similar sizes in the same transmission and possibly even certain technical features (for example, bearings, splines, etc.) can be adopted. This simplifies the construction of the powershift transmission and can contribute to saving on piece numbers. In some embodiments, since the third group has a transmission ratio significantly exceeding the transmission ratio of the first two groups, as large a spread as possible of the entire transmission can be achieved, as before. A multi-stage realization of the transmission ratio results in a pleasant transmission ratio even for the third group. The transmission ratio can be realized, for example, in two stages, in a simple manner. By means of such a construction, the diameter and/or the number of teeth of the individual gearwheels can be kept small, as a result of which, for example, a smaller distance between the transmission shafts can be provided and/or the overall size of the powershift transmission can be kept small and compact. A powershift transmission with as great a number of transmission stages as possible can thus be accommodated in a small construction space and/or implemented with a reduced overall size and reduced weight.

A multi-stage transmission ratio can be implemented simply by the third group having a planetary transmission such that the transmission ratio of the third group is produced from a combination of the transmission ratio of the first group with the transmission ratio of the planetary transmission.

The first group and the third group have a common gearwheel which is arranged in a freely rotatable manner on the output shaft. Said gearwheel can be connected, for conjoint rotation, to a sun gear of the planetary transmission, which furthermore has a stationary ring gear and a planet carrier, and/or can be connectable, for conjoint rotation, to the output shaft selectively via a shifting element of the first group or a shifting element of the third group.

In some embodiments, an advantageous configuration of the powershift transmission is produced if the groups have a spread of at least approximately 9, and/or the first and the second group have a transmission ratio of in each case approximately 1.7 or a spread of approximately 3, and/or the third group has a transmission ratio of approximately 5.1. An individual transmission ratio of 5.1 within a toothing stage appears to be less pleasant and would require a large construction space, for example significantly greater center distances. These disadvantages are prevented by the provision of a series arrangement of transmission ratios in the region of the third group.

Advantageously, four gears and/or, furthermore, two shifting stages and/or a reverse driving mode are provided. Together with the three groups, up to 24 forward gears and 12 reverse gears can thereby be produced. However, to improve the shifting convenience, conventionally only 23 forward gears are used.

In some embodiments, at least one input shaft and one output shaft are provided. Gearwheels and shifting elements can in each case be provided on them. The input shaft can be driven by an engine of the vehicle and set into rotation in order to transmit a torque. The output shaft in turn can be connected to the wheels and/or to further functional groups of the vehicle in order to drive them and/or to transmit a torque to them. The output shaft can thus drive, for example, wheels of a vehicle and/or also one or more power take-off shafts. The output shaft can be connected to a mechanical front wheel drive (MFWD for short) for the selective driving of (front) wheels of the vehicle. Furthermore, at least one intermediate shaft is provided, with gearwheels and shifting elements also being provided thereon, for example in order to produce further shifting stages.

The shifting elements for selecting the shifting stage can be arranged on the input shaft, the gears are arranged on the intermediate shaft and/or the group is arranged on the output shaft, and/or a further shifting element for selecting at least one reverse driving mode can be provided on the input shaft or the output shaft.

In some embodiments, at least one of the shifting elements is designed in the manner of a multi-plate clutch with at least one inner plate carrier, an outer plate carrier and a plurality of clutch plates.

If the gearwheels are helically toothed, this can promote a more uniform transmission of torque. Furthermore, this can improve the smooth running of the powershift transmission and reduce the production of noise.

It is advantageous if a vehicle has at least one previously described powershift transmission. In this way, for example, the complexity of the vehicle can be reduced, construction space saved and/or used in some other way and/or the vehicle can be manufactured cost-effectively. The vehicle is for example an agricultural or industrial working vehicle, in the manner of an agricultural tractor or a tractor. However, the vehicle can also be a construction vehicle, a transport/towing vehicle or any other suitable vehicle, for example in the manner of a utility vehicle.

BRIEF DESCRIPTION OF THE DRAWINGS

The disclosure and further advantages and advantageous developments of the disclosure and embodiments of the disclosure will be described and explained in more detail below with reference to the drawing which shows an exemplary embodiment of the disclosure.

In the drawing.

DETAILED DESCRIPTION

Figure 1:
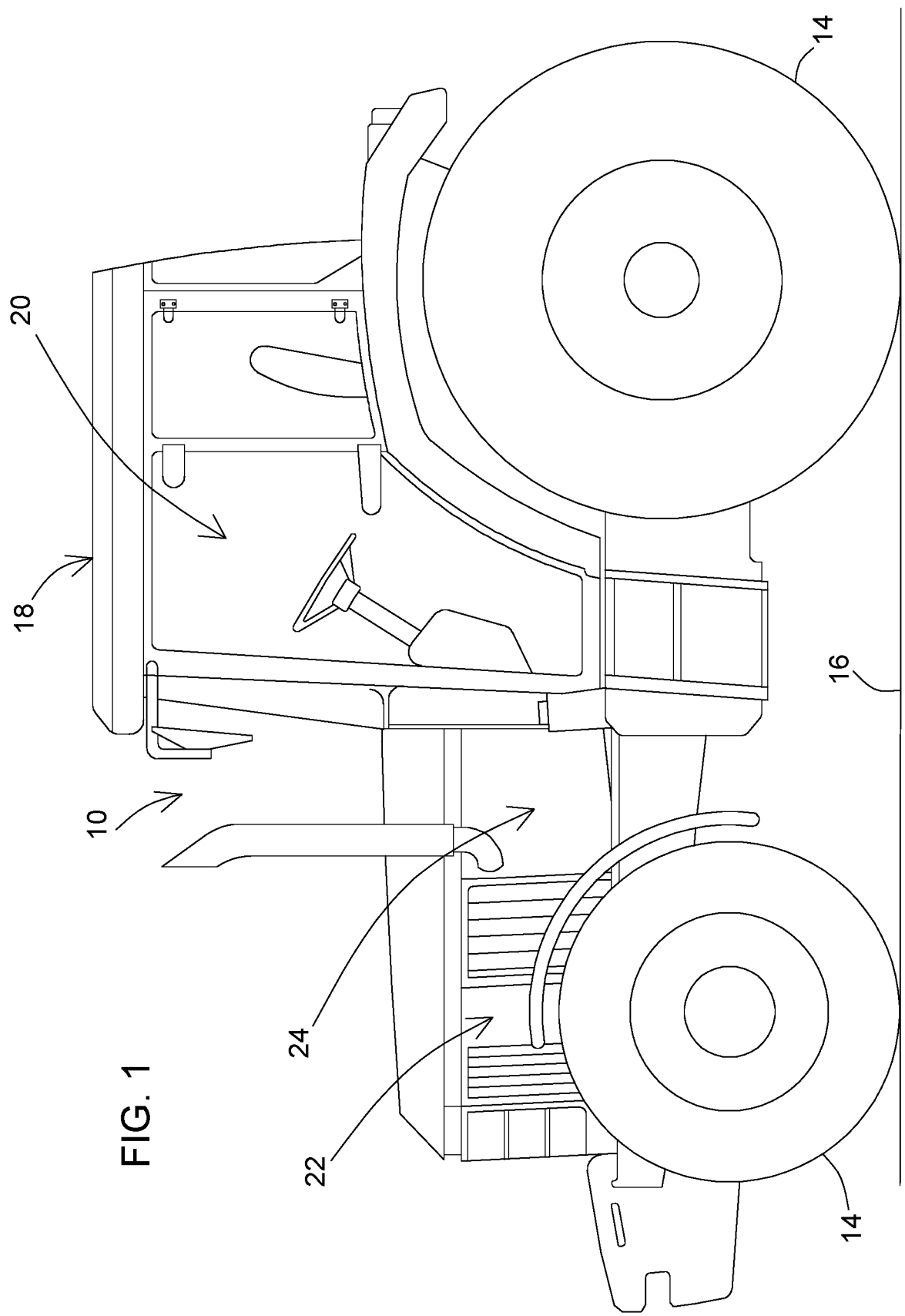
FIG. 1 shows a side view of an agricultural vehicle having a drive and a powershift transmission.

FIG. 1 of the drawing shows an agricultural vehicle 10 in the manner of an agricultural tractor or tractor which is supported on the underlying surface 16 via front and rear wheels 14. An operator station 20 is arranged in a cab 18. The vehicle 10 furthermore has a drive 22 and a powershift transmission 24, which will be discussed in more detail below.

Construction

Figure 2:
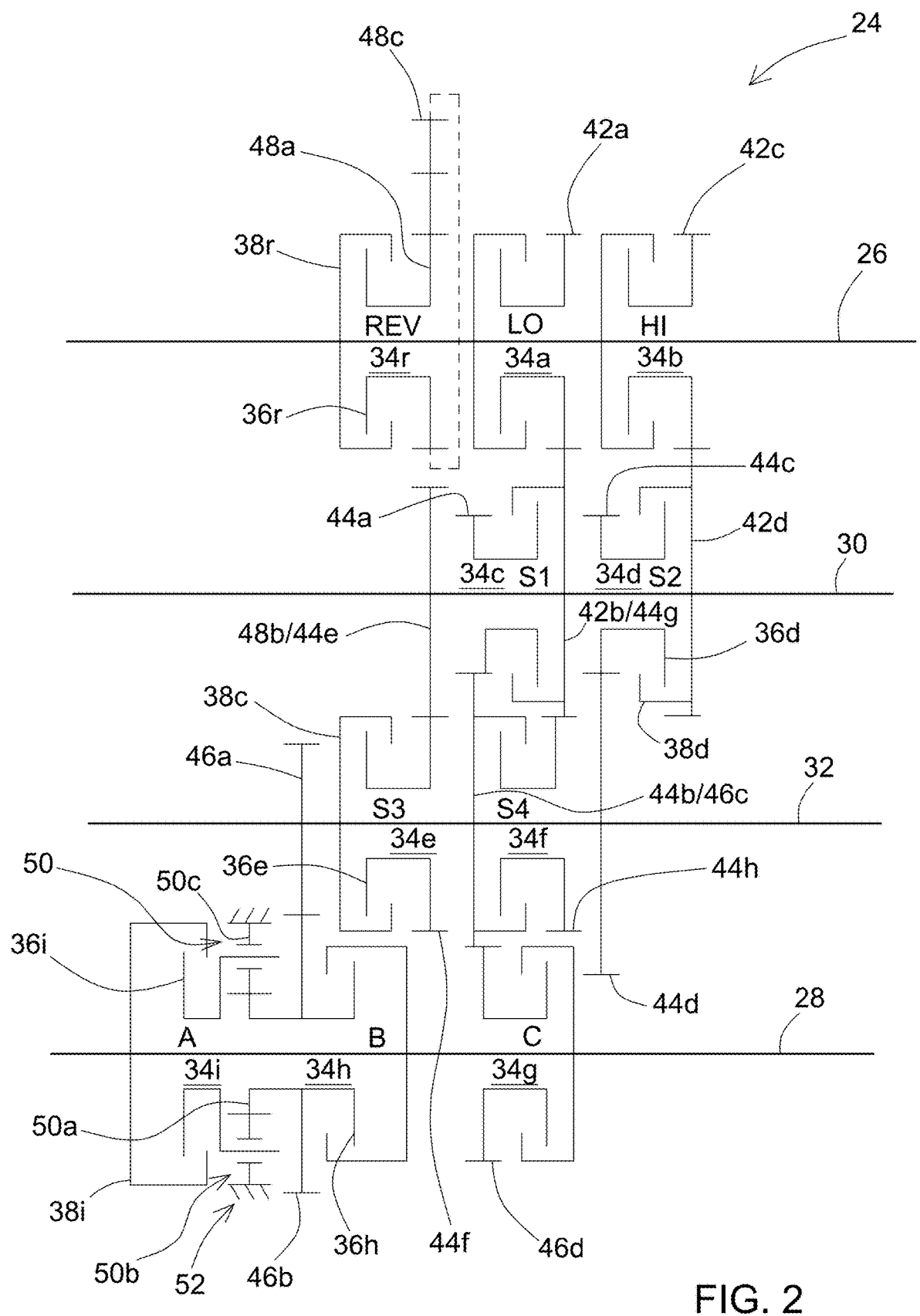
FIG. 2 shows a functional illustration of the powershift transmission as a "stick diagram"

According to the exemplary embodiment shown in simplified form in FIG. 2 as what is referred to as a stick diagram for illustrating the operation, the powershift transmission 24 has a plurality of axially parallel transmission shafts 26, 28, 30, 32 which are referred to below as input shaft 26, output shaft 28 and intermediate shafts 30 and 32. Furthermore, shifting elements 34 *a-i* are provided, the shifting elements 34*a, b* being used to select a shifting stage in the manner of a high gear Hi and a crawling gear Lo, the shifting elements 34*c-f* being used to select a gear S1-S4, and the shifting elements 34*g-i* to select a group A, B, C. Furthermore, a shifting element 34*r* is provided for shifting into a reverse driving mode REV.

The shifting elements 34*a, b* are arranged on the input shaft, the shifting elements 34*c, d* are arranged on the first intermediate shaft 30, the shifting elements 34*e, f* are arranged on the second intermediate shaft, and the shifting elements 34*g, h,* and *i* are arranged on the output shaft 28. According to the exemplary embodiment which is shown, the shifting elements 34 *a-i, r* are each designed in the manner of known, hydraulically actuable multi-plate clutches with an inner and an outer plate carrier 36 *a-i, r,* 38 *a-i, r* and a multiplicity of clutch plates, not illustrated. The shifting elements 34 *a-i, r* are activated by a control device, likewise not illustrated, of the vehicle 10 in such a manner that they can be closed in a known manner by means of action upon them with a hydraulic medium counter to the effect of spring means, likewise not shown, in order to permit transmission of a rotation or a torque.

Furthermore, the powershift transmission 24 has a plurality of gearwheels 42 *a-d,* 44 *a-h* and 46*a-d* which mesh together in order to obtain transmission ratio stages and are helically toothed in a known manner. The gearwheels 42*a-c* are assigned here to the shifting stages Hi/Lo, the gearwheels 44*a-h* to the gears S1-S4, the gearwheels 46 *a-c* to the groups A, B, C and the gearwheels 48 *a-c* to the reverse driving mode REV. The gearwheels 42*a*/44*g,* 44*e*/48*b,* 44*b*/46*c* have a dual use. To improve the overview, the gearwheels 42 a-d, 44 a-h, 46 a-d and 48 a-c along with their respective function are listed in Table 1 below.

TABLE 1

| | |
|---|---|
| 42a | Lo driving gearwheel |
| 42b | Lo output gearwheel* |
| 42c | Hi driving gearwheel |
| 42d | Hi output gearwheel |
| 44a | S1 driving gearwheel |
| 44b | S1 output gearwheel*** |
| 44c | S2 driving gearwheel |
| 44d | S2 output gearwheel |
| 44e | S3 driving gearwheel |
| 44f | S3 output gearwheel |
| 44g | S4 driving gearwheel* |
| 44h | S4 output gearwheel |
| 46a | A/B driving gearwheel |
| 46b | A/B output gearwheel |
| 46c | C driving gearwheel*** |
| 46d | C output gearwheel |
| 48a | REV driving gearwheel |
| 48b | REV output gearwheel** |
| 48c | REV freewheeling gearwheel |

*42b and 44g dual use
**44e and 48b dual use
***44b and 46c dual use

The gearwheels 42a, c and 48a are mounted rotatably on the input shaft 26, the gearwheels 44a, c are mounted rotatably on the first intermediate shaft 30, the gearwheels 44g, h are mounted rotatably on the second intermediate shaft 32, and the gearwheels 46b, d are mounted rotatably on the output shaft 28, wherein all of these gearwheels 42a, c, 44a, c, g, k, 46b, c and 48r are connected, in each case for conjoint rotation, to a corresponding one of the inner plate carriers 36a, b, c, d, e, f, g and 36r in such a manner that they are connectable, in each case for conjoint rotation, to the respective transmission shaft 26, 28, 30, 32 by means of a corresponding one of the shifting elements 34 a-g or r.

The gearwheels 42c, 44d, 44e/48b, 42b/44g, 44b/46c, 46a are each correspondingly connected for conjoint rotation to one of the intermediate shafts 30, 32, wherein the gearwheels 42c, 42b/44g, 44e/48b are provided on the first intermediate shaft 30 and the gearwheels 46a, 44b/46c and 44d on the second intermediate shaft 32.

Furthermore, a planetary transmission 50 with a sun gear 50a, a planet gear set 50b and a ring gear 50c is provided. The sun gear 50a of the planetary transmission 50 is mounted in a freely rotatable manner on the output shaft 28 and is connected, for conjoint rotation, to the inner plate carrier 36h of the shifting element 34h in such a manner that it is connectable, for conjoint rotation, to the output shaft 28 by means of the shifting element 34h. The planet gear set 50b meshes with the sun gear 50a and the ring gear 50c and is connected, for conjoint rotation, to the inner plate carrier 36i of the shifting element 34i in such a manner that it is connectable, for conjoint rotation, to the output shaft 28 by means of the shifting element 34i. According to the exemplary embodiment which is shown, the ring gear 50c is fixedly connected to a housing 52, shown merely by way of indication, of the powershift transmission 24.

The gearwheel 42a of the shifting stage Lo meshes here with the gearwheel 42b of the shifting stage Lo, the gearwheel 42c of the shifting stage Hi with the gearwheel 42d of the shifting stage Hi, the gearwheel 44a of the gear S1 with the gearwheel 44b of the gear S1, the gearwheel 44c of the gear S2 with the gearwheel 44d of the gear S2, the gearwheel 44e of the gear S3 with the gearwheel 44f of the gear S3, and the gearwheel 44g with the gearwheel 44h of the gear S4.

The gearwheel 46a of the groups A/B meshes with the gearwheel 46b of the groups A/B, and the gearwheel 46c of the group C meshes with the gearwheel 46d of the group C. The gearwheel 46b is connected, for conjoint rotation, both to the inner plate carrier 36h of the shifting element 34h of the group B and to the sun gear 50a of the planetary transmission 50.

Reference is now also made to Table 2 below which, by way of a stick diagram, shows the driving stages which can be implemented by the powershift transmission 24, namely forward gears F01-F23 and reverse gears 01-12. A total of twenty-four forward gears are available (shifting stage Hi, Lo×gear S1-S4×group A, B, C/2×4×3), wherein gear F08 a/b is used twice in order to improve the shifting convenience. Furthermore, twelve reverse gears are available (reverse driving mode REV×gear S1-S4×group A, B, C/1×4×3):

TABLE 2

| | Lo | Hi | Rev | S1 | S2 | S3 | S4 | A | B | C |
|---|---|---|---|---|---|---|---|---|---|---|
| F01 | x | | | x | | | | x | | |
| F02 | | x | | x | | | | x | | |
| F03 | x | | | | x | | | x | | |
| F04 | | x | | | x | | | x | | |
| F05 | x | | | | | x | | x | | |
| F06 | | x | | | | x | | x | | |
| F07 | x | | | | | | x | x | | |
| F08a | | x | | | | | x | x | | |
| F08b | x | | | x | | | | | x | |
| F09 | | x | | x | | | | | x | |
| F10 | x | | | | x | | | | x | |
| F11 | | x | | | x | | | | x | |
| F12 | x | | | | | x | | | x | |
| F13 | | x | | | | x | | | x | |
| F14 | x | | | | | | x | | x | |
| F15 | | x | | | | | x | | x | |
| F16 | x | | | x | | | | | | x |
| F17 | | x | | x | | | | | | x |
| F18 | x | | | | x | | | | | x |
| F19 | | x | | | x | | | | | x |
| F20 | x | | | | | x | | | | x |
| F21 | | x | | | | x | | | | x |
| F22 | x | | | | | | x | | | x |
| F23 | | x | | | | | x | | | x |
| R01 | | | x | x | | | | x | | |
| R02 | | | x | | x | | | x | | |
| R03 | | | x | | | x | | x | | |
| R04 | | | x | | | | x | x | | |
| R05 | | | x | x | | | | | x | |
| R06 | | | x | | x | | | | x | |
| R07 | | | x | | | x | | | x | |
| R08 | | | x | | | | x | | x | |
| R09 | | | x | x | | | | | | x |
| R10 | | | x | | x | | | | | x |
| R11 | | | x | | | x | | | | x |
| R12 | | | x | | | | x | | | x |

If, for example, the shifting stage Lo, the gear S1 and the group A are engaged, the gearwheel 42a of the shifting stage Lo is connected to the input shaft 26 via the shifting element 34a of the stage Lo. The gearwheel 42a meshes with the gearwheel 42b of the shifting stage Lo, which gearwheel is connected, for conjoint rotation, via the shifting element 34e to the gearwheel 44a which, in turn, meshes with the gearwheel 44b of the gear S1 such that said gearwheel 44b of the gear S1, which gearwheel is connected fixedly to the intermediate shaft 32, sets the intermediate shaft 32 and therefore the gearwheel 46a, which is likewise fixedly connected to the latter, into rotation. The gearwheel 46a meshes in turn with the gearwheel 46b, which is fixedly connected both to the inner plate carrier of the open shifting element 34h of the group B and also to the sun gear 50a of the planetary transmission 50, such that said sun gear drives the planet carrier 50*b*, which revolves in the stationary ring gear 50*c*, in such a manner that said planet carrier sets the output shaft 28 into rotation via the closed shifting element 34*i* of the group A.

If, instead of group B, group A is selected, the shifting element 34*h* connects the gearwheel 46*b* to the output shaft 28 via the inner plate carrier 36*h* and the outer plate carrier 38*h*.

When group C is engaged, the gearwheel 46*d* is fixedly connected to the output shaft 28 via the shifting element 34*g*.

Design

The design of groups A, B, C and the transmission ratio thereof will now be discussed. In the embodiments below, the term transmission spread refers to the transmission ratio of a transmission, that is to say the difference between the smallest and the largest transmission ratio. The group arranged on the right in the drawing is designated first group C, the middle second group B and the one arranged on the left third group A.

The main spread or the greatest spread of the powershift transmission 24 shown is illustrated in the region of groups A, B, C. This is then divided further by the gears S1-S4 connected upstream which in turn are divided further by shifting stages Hi/Lo connected upstream.

The spread for the groups A, B, C shown is in the region of approximately 9. The transmission ratio jump from the first group C to the second group B and the jump from the second group B to the third group A is in each case approximately 3, and therefore a balanced design is obtained with an overall spread of approximately 9. The absolute value of the respective transmission ratio jump is produced as the root of the overall spread of groups A, B, C.

In order to provide as advantageous sizes as possible for the gearwheels 46*c*, *d* of the first group C, first of all the second group and the third group B are uniformly distributed. As previously, the transmission ratio or the spread between the first group and the second group A, B is assumed to be the root of the overall spread and is therefore approximately 1.7. The second group B has a transmission ratio in the step down direction of 1.7 and the first group C a transmission ratio of 1.7 in the step up direction. Therefore, the output gearwheel 46*b* of the second group B is only approximately 1.7 times greater than the input gearwheel 46*a* of the group B or the input gearwheel 46*c* of the first group C is only 1.7 times greater than the output gearwheel 46*d* of the first group C.

In order to obtain the desired spread of the groups of approximately 9, the third group A is correspondingly designed. The latter therefore has an overall transmission ratio of 1.7 (transmission ratio jump between the second group B and the third group A)*3=5.1.

This transmission ratio is produced by a plurality of series-connected transmission ratios, namely by a combination of the transmission ratio of the second stage B (transmission ratio: 1.7) and the downstream planetary transmission 50 (transmission ratio: 3).

By matching of the transmission ratio of the second group B and of the first group, the gearwheel 46*c* (output gearwheel) of the first group C is, furthermore, the same size as the gearwheel 44*b* (output gearwheel) of the first gear S1. This permits a functional integration or merging of the two gearwheels 44*b*/46*c* in one component and therefore a saving on costs, construction space and weight, and a reduction of the inertia.

Figure 3:
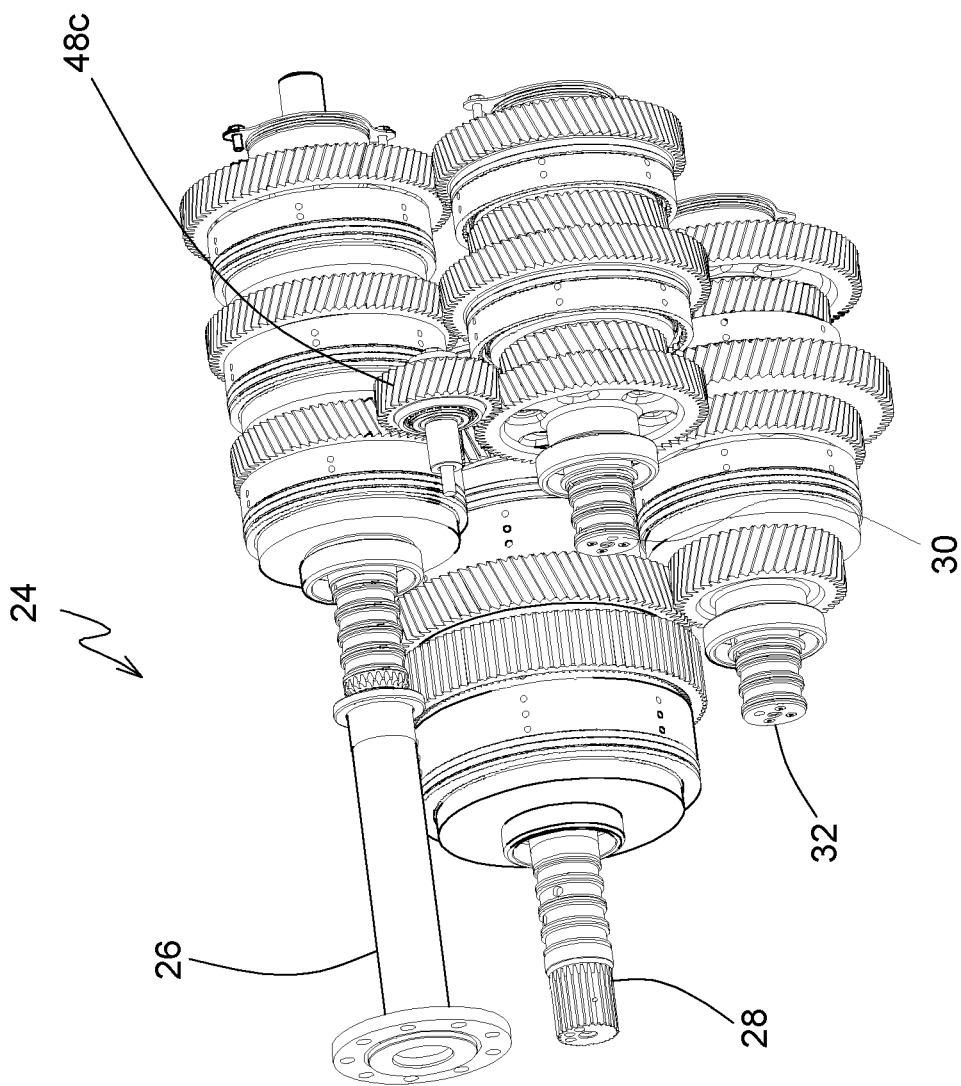
FIG. 3 shows the powershift transmission in a three-dimensional illustration from the front right.

Finally, to depict the spatial arrangement of the components of the powershift transmission 24, reference is now made to FIG. 3 of the drawing which shows the powershift transmission from the front right. It becomes clear here that the previously described configuration and design of the powershift transmission 24 results in a particularly compact constructional form which takes up only a small construction space.

LIST OF DESIGNATIONS

10 Vehicle
14 Wheels
16 Underlying surface
18 Cab
20 Operator station
22 Drive
24 Powershift transmission
26 Input shaft
28 Output shaft
30 Intermediate shaft
32 Intermediate shaft
34 *a-i, r* Shifting elements
36 *a-i, r* Plate carrier, on inside
38 *a-i, r* Plate carrier, on outside
42 *a-d* Gearwheels
44 *a-h* Gearwheels
46 *a-d* Gearwheels
48 *a-c* Gearwheels
50 Planetary transmission
50*a* Sun gear
50*b* Planet gear set
50*c* Ring gear
52 Housing

The invention claimed is:

1. A powershift transmission for a vehicle, comprising:
an input shaft including a low driving gearwheel and a high driving gearwheel;
a first intermediate shaft including a low output gearwheel, a high output gearwheel, a first speed driving gearwheel, a second speed driving gearwheel, and a third speed driving gearwheel;
a second intermediate shaft including a first speed output gearwheel, a second speed output gearwheel, a third speed output gearwheel, a first-second group driving gearwheel, and a fourth speed output gearwheel;
an output shaft including a first-second group output gearwheel and a third group output gearwheel;
wherein the low driving gearwheel meshes with the low output gearwheel and the high driving gearwheel meshes with the high output gearwheel;
wherein the first speed gearwheel meshes with the first speed output gearwheel, the second speed driving gearwheel meshes with the second speed output gearwheel, the third speed driving gearwheel meshes with the third speed output gearwheel, and the low output gearwheel meshes with the fourth speed output gearwheel;
wherein the first-second group driving gearwheel meshes with the first-second output gearwheel and the first speed output gearwheel meshes with the third group gearwheel.

2. The powershift transmission of claim 1, further comprising:
a low shifting element connecting the low driving gearwheel to the input shaft for conjoint rotation;
a high shifting element connecting the high driving gearwheel to the input shaft for conjoint rotation;
a first speed shifting element connecting the first speed driving gearwheel to the first intermediate shaft for conjoint rotation;

a second speed shifting element connecting the second speed driving gearwheel to the first intermediate shaft for conjoint rotation;

a third speed shifting element connecting the third speed output gearwheel to the second intermediate shaft for conjoint rotation;

a fourth speed shifting element connecting the fourth speed output gearwheel to the second intermediate shaft for conjoint rotation;

a first group shifting element connecting the first-second group output gearwheel via a planetary transmission to the output shaft for conjoint rotation;

a second group shifting element connecting the first-second group output gearwheel to the output shaft for conjoint rotation; and a third group shifting element connecting the third group gearwheel to the output shaft for conjoint rotation.

3. The powershift transmission of claim 1, wherein the input shaft includes a reverse driving gearwheel, the reverse driving gearwheel meshes with a reverse freewheeling gearwheel which meshes with the third speed driving gearwheel, and a reverse shifting element connects the reverse driving gearwheel to the input shaft for conjoint rotation.

4. The powershift transmission of claim 1, wherein the first-second output gearwheel is connected to a sun gear of the planetary transmission, a planet carrier of the planetary transmission is connected to the output shaft via the first group shifting element, and a ring gear of the planetary transmission is stationary.

5. The powershift transmission of claim 1, wherein each of the shifting elements include a multi-plate clutch with at least one inner plate carrier, an outer plate carrier, and a plurality of clutch plates.

6. The powershift transmission of claim 1, wherein each of the gearwheels are helically toothed.

7. A vehicle including a powershift transmission, comprising:

an input shaft including a low driving gearwheel and a high driving gearwheel;

a first intermediate shaft including a low output gearwheel, a high output gearwheel, a first speed driving gearwheel, a second speed driving gearwheel, and a third speed driving gearwheel;

a second intermediate shaft including a first speed output gearwheel, a second speed output gearwheel, a third speed output gearwheel, a first-second group driving gearwheel, and a fourth speed output gearwheel;

an output shaft including a first-second group output gearwheel and a third group gearwheel;

wherein the low driving gearwheel meshes with the low output gearwheel and the high driving gearwheel meshes with the high output gearwheel;

wherein the first speed gearwheel meshes with the first speed output gearwheel, the second speed driving gearwheel meshes with the second speed output gearwheel, the third speed driving gearwheel meshes with the third speed output gearwheel, and the low output gearwheel meshes with the fourth speed output gearwheel;

wherein the first-second group driving gearwheel meshes with the first-second output gearwheel and the first speed output gearwheel meshes with the third group gearwheel.

8. The vehicle of claim 7, further comprising:

a low shifting element connecting the low driving gearwheel to the input shaft for conjoint rotation;

a high shifting element connecting the high driving gearwheel to the input shaft for conjoint rotation;

a first speed shifting element connecting the first speed driving gearwheel to the first intermediate shaft for conjoint rotation;

a second speed shifting element connecting the second speed driving gearwheel to the first intermediate shaft for conjoint rotation;

a third speed shifting element connecting the third speed output gearwheel to the second intermediate shaft for conjoint rotation;

a fourth speed shifting element connecting the fourth speed output gearwheel to the second intermediate shaft for conjoint rotation;

a first group shifting element connecting the first-second group output gearwheel via a planetary transmission to the output shaft for conjoint rotation;

a second group shifting element connecting the first-second group output gearwheel to the output shaft for conjoint rotation; and a third group shifting element connecting the third group gearwheel to the output shaft for conjoint rotation.

9. The vehicle of claim 7, wherein the input shaft includes a reverse driving gearwheel, the reverse driving gearwheel meshes with a reverse freewheeling gearwheel which meshes with the third speed driving gearwheel, and a reverse shifting element connects the reverse driving gearwheel to the input shaft for conjoint rotation.

10. The vehicle of claim 7, wherein the first-second output gearwheel is connected to a sun gear of the planetary transmission, a planet carrier of the planetary transmission is connected to the output shaft via the first group shifting element, and a ring gear of the planetary transmission is stationary.

11. The vehicle of claim 7, wherein each of the shifting elements include a multi-plate clutch with at least one inner plate carrier, an outer plate carrier, and a plurality of clutch plates.

12. The vehicle of claim 7, wherein each of the gearwheels are helically toothed.

* * * * *